US012534848B2

(12) United States Patent
Leibman et al.

(10) Patent No.: US 12,534,848 B2
(45) Date of Patent: Jan. 27, 2026

(54) INDUCTION HEATING SYSTEM FOR A DRYER APPLIANCE

(71) Applicant: Haier US Appliance Solutions, Inc., Wilmington, DE (US)

(72) Inventors: Alexander B. Leibman, Louisville, KY (US); Nitinkumar Hulsure, Hyderabad (IN)

(73) Assignee: Haier US Appliance Solutions, Inc., Wilmington, DE (US)

( * ) Notice: Subject to any disclaimer, the term of this patent is extended or adjusted under 35 U.S.C. 154(b) by 538 days.

(21) Appl. No.: 17/975,210

(22) Filed: Oct. 27, 2022

(65) Prior Publication Data

US 2024/0141579 A1 May 2, 2024

(51) Int. Cl.

*D06F 58/20* (2006.01)
*D06F 58/26* (2006.01)
*D06F 58/28* (2006.01)
*F26B 3/347* (2006.01)

(52) U.S. Cl.

CPC .............. *D06F 58/26* (2013.01); *F26B 3/347* (2013.01)

(58) Field of Classification Search

CPC ......... D06F 58/28; D06F 58/26; D06F 58/206
See application file for complete search history.

(56) References Cited

U.S. PATENT DOCUMENTS 9,544,945 B2 * 1/2017 Hadoulias ............... F24H 3/022
9,677,812 B1 6/2017 Hoyner
9,746,202 B2 8/2017 Takemoto
9,782,705 B2 10/2017 Thrasher et al.
10,494,754 B2 12/2019 Cho et al.
10,590,595 B2 3/2020 Kalze et al.
10,594,413 B2 3/2020 Reul
10,626,543 B2 * 4/2020 Lim ........................ D06F 58/26
10,648,733 B2 5/2020 Kim et al.
10,662,573 B2 5/2020 Xu et al.
10,689,791 B2 6/2020 Bing et al.
10,808,351 B1 10/2020 Flachsbart et al.
10,822,739 B2 11/2020 Lim et al.
10,995,443 B2 5/2021 Wheeler
11,021,837 B2 6/2021 Bellm et al.
11,028,524 B2 6/2021 Bing et al.
2009/0195990 A1 8/2009 Honma
2019/0249355 A1 * 8/2019 Park ........................ D06F 58/26
2019/0264375 A1 * 8/2019 Park ........................ D06F 58/26
2022/0002929 A1 1/2022 Yong et al.

FOREIGN PATENT DOCUMENTS

DE 102021106783 A1 * 9/2021 .............. B01J 19/08
JP 6671227 B2 3/2020

OTHER PUBLICATIONS

English translation of DE102021106783 by PE2E Feb. 22, 2025.*

* cited by examiner

*Primary Examiner* — Deming Wan
(74) *Attorney, Agent, or Firm* — Dority & Manning, P.A.

(57) ABSTRACT

An induction heating assembly is configured for heating a flow of air in a dryer appliance. The dryer appliance includes an inlet duct in fluid communication with a chamber. The induction heating assembly includes an induction coil for generating an electromagnetic field, a heating plate for generating heat when energized by the electromagnetic field, and a heat exchanger in conductive thermal communication with the heating plate.

14 Claims, 9 Drawing Sheets

INDUCTION HEATING SYSTEM FOR A DRYER APPLIANCE

FIELD OF THE INVENTION

The present subject matter relates generally to dryer appliances, and more particularly to induction heating systems for efficiently drying articles in dryer appliances.

BACKGROUND OF THE INVENTION

Dryer appliances generally include a cabinet with a drum rotatably mounted therein. During operation, a motor rotates the drum, e.g., to tumble articles located within a chamber defined by the drum. Dryer appliances also generally include a heater assembly that passes heated air through the chamber in order to dry moisture-laden articles positioned therein. Typically, an air handler or blower is used to urge the flow of heated air from the chamber, through a trap duct, and to an exhaust duct where it is exhausted from the dryer appliance. Dryer appliances may further include filter systems for removing foreign materials, such as lint, from passing into the exhaust duct.

Conventional heater assemblies include electrical resistance heaters such as wire coils that generate heat when electrical current is passed through them. Notably, these resistance heaters are typically only 70-80% efficient, resulting in significant wasted energy during operation. In addition, for example, current dryer appliances include two resistance heater coils which are connected to three-phase power systems to energize these heaters in one of three steps—OFF for no heat, one heater ON for low heat, or two heaters ON for high heat. Therefore, the temperature within the drum may not be controlled linearly, resulting in significant operating restrictions and limited versatility in terms of using different operating cycles to dry various load types.

Accordingly, improved dryer appliances including features for improved heating versatility are desirable. More specifically, dryer appliances including features for efficiently and linearly controlling a drum temperature would be particularly beneficial.

BRIEF DESCRIPTION OF THE INVENTION

Aspects and advantages of the invention will be set forth in part in the following description, or may be obvious from the description, or may be learned through practice of the invention.

In one aspect of the present disclosure, a dryer appliance defines a vertical direction, a lateral direction, and a transverse direction. The dryer appliance includes a cabinet and a drum rotatably mounted within the cabinet. The drum defines a chamber for receipt of clothes for drying and a chamber inlet. An inlet duct is fluidly coupled to the chamber inlet and an air handler is in fluid communication with the inlet duct for urging a flow of air through the inlet duct and into the chamber. An induction heating assembly is in thermal communication with the inlet duct. The induction heating assembly includes an induction coil for generating an electromagnetic field and a heating plate for generating heat when energized by the electromagnetic field. The induction heating assembly also includes a heat exchanger in conductive thermal communication with the heating plate.

In another aspect of the present disclosure, an induction heating assembly for heating a flow of air in a dryer appliance is provided. The dryer appliance includes an inlet duct in fluid communication with a chamber. The induction heating assembly includes an induction coil for generating an electromagnetic field and a heating plate for generating heat when energized by the electromagnetic field. The induction heating assembly also includes a heat exchanger in conductive thermal communication with the heating plate.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
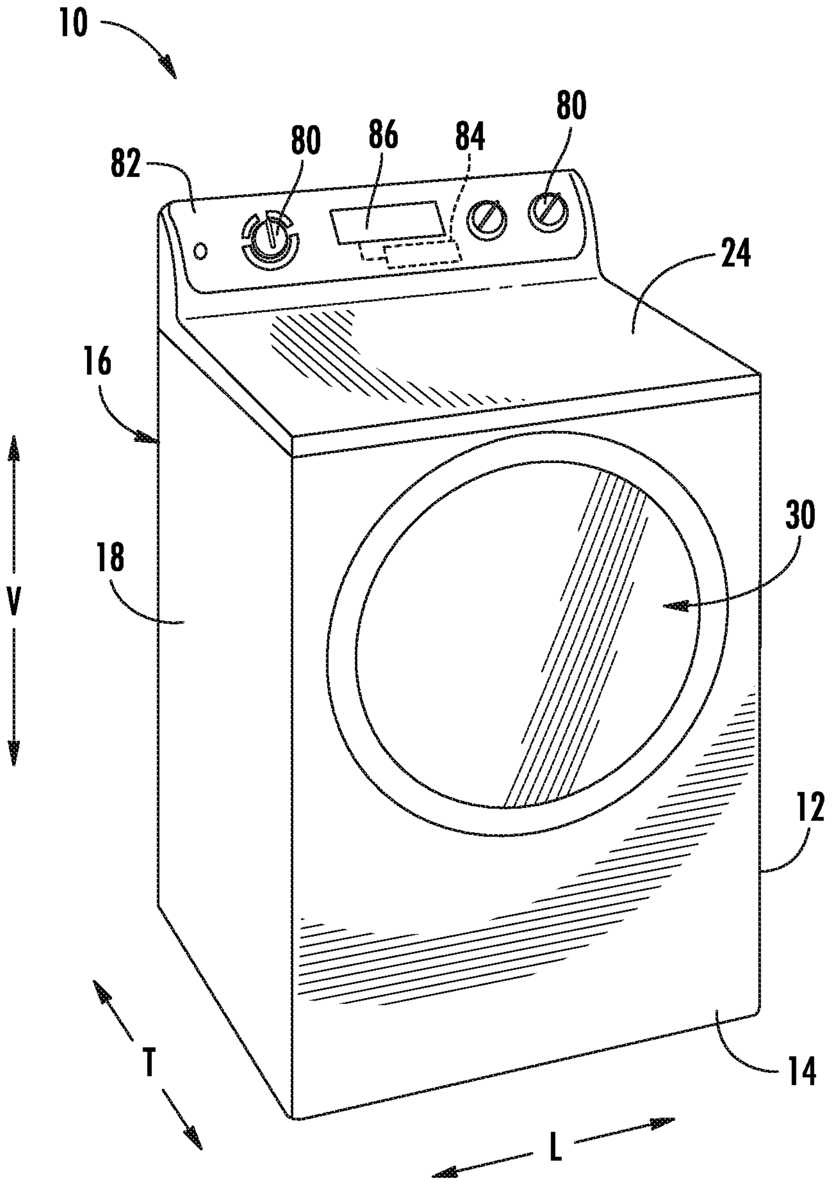
FIG. 1 provides a perspective view of a dryer appliance according to one or more exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
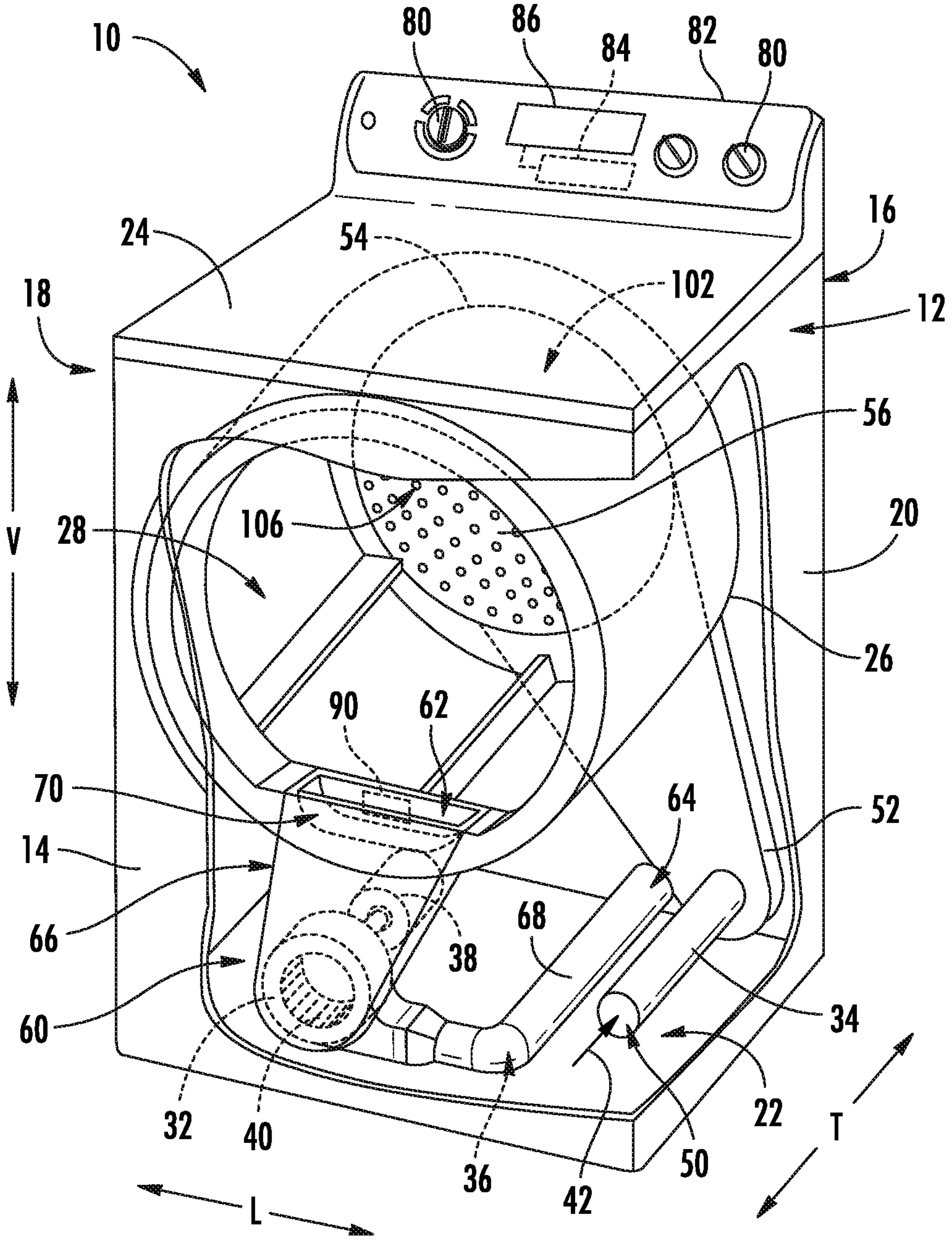
FIG. 2 provides a perspective view of the exemplary dryer appliance of FIG. 1 with portions of a cabinet of the exemplary dryer appliance removed to reveal certain components of the exemplary dryer appliance.

FIG. 1 illustrates a dryer appliance 10 according to an exemplary embodiment of the present subject matter. FIG. 2 provides another perspective view of dryer appliance 10 with a portion of a housing or cabinet 12 of dryer appliance 10 removed in order to show certain components of dryer appliance 10. While described in the context of a specific embodiment of a dryer appliance, using the teachings disclosed herein it will be understood that dryer appliance 10 is provided by way of example only. Other dryer appliances having different configurations, different appearances, and/or different features may also be utilized with the present subject matter as well. For example, the dryer appliance may be a top load or vertical axis dryer appliance, may have a different configuration and/or location for the user inputs, or may be a closed loop recirculation dryer appliance. As another example, the dryer appliance may also include features for washing articles therein, e.g., the dryer appliance may be a combination washer-dryer appliance.

Dryer appliance 10 defines a vertical direction V, a lateral direction L, and a transverse direction T. The vertical direction V, lateral direction L, and transverse direction T are mutually perpendicular and form an orthogonal direction system. Cabinet 12 includes a front panel 14, a rear panel 16, a pair of side panels 18 and 20 spaced apart from each other by front and rear panels 14 and 16, a bottom panel 22, and a top cover 24. Within cabinet 12 is a container or drum 26 which defines a chamber 28 for receipt of articles, e.g., clothing, linen, etc., for drying. Drum 26 extends between a front portion and a back portion, e.g., along the transverse direction T. In example embodiments, drum 26 is rotatable, e.g., about an axis that is parallel to the transverse direction T, within cabinet 12. A door 30 is rotatably mounted to cabinet 12 for providing selective access to drum 26.

An air handler 32, such as a blower or fan, may be provided to motivate an airflow through an air entrance duct 34 and an air exhaust passage 36 (which is generally defined within trap duct 66, exhaust conduit 68, and dryer discharge port 64). Specifically, air handler 32 may include a motor 38 which may be in mechanical communication with a blower fan 40, such that motor 38 rotates blower fan 40. In this manner, air handler 32 is configured for drawing a flow of air through chamber 28 of drum 26, e.g., in order to dry articles located therein, as discussed in greater detail below. In alternative example embodiments, dryer appliance 10 may include an additional motor (not shown) for rotating fan 40 of air handler 32 independently of drum 26. Furthermore, according to alternative embodiments, air handler 32 may be configured for circulating the flow of air within a recirculation loop instead of continuously drawing in fresh air from within cabinet 12 and discharging air through dryer discharge port 64.

As will be described in more detail below, drum 26 may be configured to receive heated air 44 that has been heated by a heating assembly (not shown in FIG. 2), e.g., in order to dry damp articles disposed within chamber 28 of drum 26. The heating assembly may generally include one or more heating elements that are in thermal communication with chamber 28. For instance, the heating elements may include one or more electrical resistance heating elements, gas burners, or induction heating elements for heating air being flowed to chamber 28. As discussed above, during operation of dryer appliance 10, motor 38 rotates fan 40 of air handler 32 such that air handler 32 draws air through chamber 28 of drum 26. In particular, air handler 32 urges ambient air 42 into inlet duct 34 via an entrance 50. Such ambient air 42 is heated by the heating assembly and the resultant flow of heated air 44 is drawn from inlet duct 34, through an intermediate duct 52, and into drum 26. The heated air enters drum 26 through an outlet of intermediate duct 52, otherwise referred to herein as a chamber inlet 54, positioned at a rear wall 56 of drum 26. In this regard, rear wall 56 of drum 26 may define chamber inlet 54 which is in fluid communication with intermediate duct 52. More specifically, according to the illustrated embodiment, chamber inlet 54 comprises a plurality of holes 106 defined in rear wall 56. In this manner, the flow of heated air 44 may pass through inlet duct 34, into intermediate duct 52, and into chamber 28 through holes 106. Although the figures herein illustrate chamber inlet 54 as being a plurality of holes 106 defined in rear wall 56, it should be appreciated that according to alternative embodiments, chamber inlet 54 may be any other suitable passage providing fluid communication between intermediate duct 52 and chamber 28. According to the illustrated exemplary embodiment, rear wall 56 is fixed such that it does not rotate while drum 26 rotates about its central axis.

Within chamber 28, the heated air can remove moisture, e.g., from damp articles disposed within chamber 28. The resultant flow of humid air then flows from chamber 28 through an outlet assembly 60 positioned within cabinet 12. Outlet assembly 60 generally defines air exhaust passage 36 that extends between a chamber outlet 62 and a dryer discharge port 64 defined in rear panel 16 of cabinet 12. Specifically, outlet assembly 60 generally includes a trap duct 66 that extends between chamber outlet 62 and air handler 32, and an exhaust conduit 68 that extends between air handler 32 and dryer discharge port 64. During a dry cycle, the flow of humid air from chamber 28 passes through trap duct 66 to air handler 32 and through exhaust conduit 68 where it is discharged through dryer discharge port 64.

According to exemplary embodiments, an external duct (not shown) is in fluid communication with dryer discharge port 64. For instance, the external duct may be attached (e.g., directly or indirectly attached) to cabinet 12 at rear panel using any suitable connector (e.g., collar, clamp, etc.). In residential environments, the external duct may be in fluid communication with an outdoor environment (e.g., outside of a home or building in which dryer appliance 10 is installed). During a dry cycle, air may thus flow from exhaust conduit 68 and through the external duct before being exhausted to the outdoor environment.

In exemplary embodiments, trap duct 66 may include a filter portion 70 which includes a screen filter or other suitable device for removing lint and other particulates as humid air is drawn out of chamber 28. The humid air is drawn through filter portion 70 by air handler 32 before being passed through exhaust conduit 68. After the clothing articles have been dried (or a drying cycle is otherwise completed), the clothing articles are removed from drum 26, e.g., by accessing chamber 28 by opening door 30. The filter portion 70 may further be removable such that a user may collect and dispose of collected lint between drying cycles.

One or more selector inputs 80, such as knobs, buttons, touchscreen interfaces, etc., may be provided on a cabinet backsplash 82 and may be in communication with a processing device or controller 84. Signals generated in controller 84 operate motor 38, the heating assembly, and other system components in response to the position of selector inputs 80. Additionally, a display 86, such as an indicator light or a screen, may be provided on cabinet backsplash 82. Display 86 may be in communication with controller 84, and may display information in response to signals from controller 84.

As used herein, "processing device" or "controller" may refer to one or more microprocessors or semiconductor devices and is not restricted necessarily to a single element. The processing device can be programmed to operate dryer appliance 10. The processing device may include, or be associated with, one or more memory elements (e.g., non-transitory storage media). In some such embodiments, the memory elements include electrically erasable, programmable read only memory (EEPROM). Generally, the memory elements can store information accessible processing device, including instructions that can be executed by processing device. Optionally, the instructions can be software or any set of instructions and/or data that when executed by the processing device, cause the processing device to perform operations. For certain embodiments, the instructions include a software package configured to operate appliance 10 and execute certain cycles or operating modes.

In some embodiments, dryer appliance 10 also includes one or more sensors that may be used to facilitate improved operation of dryer appliance 10. For example, dryer appliance 10 may include one or more temperature sensors 90. Temperature sensor 90 is generally operable to measure internal temperatures in dryer appliance 10. In some embodiments, temperature sensor 90 is disposed proximal to chamber outlet 62 of drum 26 (e.g., within trap duct 66). In additional or alternative embodiments, a temperature sensor 90 may be disposed within exhaust conduit 68, or otherwise in thermal communication therewith. For example, temperature sensor 90 may extend at least partially within exhaust passage 36 to measure the temperature of air flowing therethrough. In further additional or alternative embodiments, a temperature sensor 90 may be disposed at any other suitable location within dryer appliance 10 to detect the temperature of a flow of air (e.g., downstream from chamber 28). Temperature sensor 90 may be a thermistor, thermocouple, or any other suitable sensor for detecting a specific temperature value of air within appliance 10. When assembled, temperature sensor 90 may be in communication with (e.g., electrically coupled to) controller 84, and may transmit readings to controller 84 as required or desired.

FIGS. 3 through 9 illustrate exemplary heating systems which may be used with a dryer appliance, such as dryer appliance 10 or other dryer appliances, according to various embodiments of the present subject matter. As illustrated, induction heating assembly 100 is generally in thermal communication with an inlet duct of a dryer appliance, e.g., inlet duct 34, for heating the flow of ambient air 42 prior to entering chamber 28. Induction heating assembly 100 can be implemented in any suitable dryer appliance, including for example but without limitation, dryer machine appliance 10 of FIGS. 1 and 2. Accordingly, to provide context to induction heating assembly 100, reference numerals utilized to describe the features of dryer appliance 10 in FIGS. 1 and 2 will be used below by way of example.

According to an exemplary embodiment, induction heating assembly 100 generally includes an induction coil 110 positioned in proximity to a heating plate 112. Induction coil 110 is generally configured for generating an electromagnetic field when supplied with a high-frequency alternating current. In addition, heating plate 112 is generally configured for generating heat when energized by the electromagnetic field, e.g., the electromagnetic field may induce eddy currents in the heating plate 112 and thereby produce Joule heat in the heating plate 112. In this regard, for example, heating plate 112 may generally be constructed of a ferrous material such as iron, an iron alloy, or any other suitable material that generates heat in the presence of an electromagnetic field. The induction heating assembly 100 may include a heat sink, and the heat sink may include the heating plate 112 and a heat exchanger 114. The heat exchanger 114 may be in conductive thermal communication with the heating plate 112, e.g., whereby the heat exchanger 114 is heated when the heating plate 112 generates heat in response to the electromagnetic field from induction coil 110. For example, the heat exchanger 114 may be in conductive thermal communication with the heating plate 112 via direct contact between the heat exchanger 114 and the heating plate 112, or may be in conductive thermal communication with the heating plate 112 via direct contact with one or more intervening parts and the heat exchanger 114 and the heating plate 112. For example, such intervening parts may include the inlet duct 34, such as an outer wall thereof.

The heat exchanger 114 may be configured for heat transfer to the ambient air 42 as the ambient air 42 flows through the inlet duct 34, e.g., thereby providing the flow of heated air 44. Thus, the heat exchanger 114 may be in convective thermal communication with the ambient air 42 and/or with the drum 26 downstream of the inlet duct 34. In this regard, for example, heat exchanger 114 may generally be constructed of a material having a high thermal conductivity, e.g., a thermal conductivity that is greater than that of the heating plate 112. For example, where the heating plate 112 may include a ferritic material, the heat exchanger 114 may include one or more materials having a greater thermal conductivity than the ferritic material of the heating plate 112, such as an aluminum material. Thus, the heating plate 112 may include a first material, e.g., a ferritic material, and the heat exchanger 114 may include a second material different from the first material, such as a material having a higher thermal conductivity than the first material, e.g., an aluminum material. In various embodiments, the second material may be, e.g., aluminum, copper, molybdenum, tungsten, and/or zinc, including alloys of any one or more of the foregoing materials. Further, the heat exchanger 114 may be configured for transferring heat to the ambient air 42 flowing into and/or through the dryer appliance 10, such as through one or more ducts, e.g., ducts 34 and 52, thereof, e.g., whereby a flow of heated air 44 (FIG. 7) is provided to the chamber 28. Such configuration of the heat exchanger 114 may include an increased surface area, e.g., a high surface area to volume ratio, to provide contact with the flow of ambient air 42 and heat transfer thereto. For example, the heat exchanger 114 may include a plurality of fins. Thus, the air urged into and through the dryer appliance 10 by the air handler 32 may flow over, around, and/or between the fins of the plurality of fins of the heat exchanger 114, thereby transferring heat from the heat exchanger 114 to the air, e.g., heat may be transferred from the heating plate 112 which is heated in response to the electromagnetic filed from coil 110 to the heat exchanger 114 by conductive thermal communication and heat may be transferred from the heat exchanger 114 to the air. In some embodiments, the plurality of fins of the heat exchanger 114 may be oriented generally along, e.g., generally parallel to, the direction of the flow of ambient air 42 urged into and/or through the inlet duct 34 by the air handler 32. As another example of a configuration of the heat exchanger 114 having a high surface area to volume ratio for contact with and heat transfer to the flow of ambient air 42, the plurality of fins of the heat exchanger 114 may be tapered and may be oriented generally perpendicular to the flow of ambient air 42, such as the fins of the heat exchanger 114 may be or act as airfoils or rotor blades, e.g., whereby the induction heating assembly 100 may include one or more rotary components, such as an impeller.

Notably, according to an exemplary embodiment, controller 84 may be operably coupled to induction coil 110 and may be configured for energizing induction coil 110 as needed for a particular dryer operating cycle. In this regard, for example, controller 84 may be configured for progressively or linearly adjusting the electromagnetic field generated by induction coil 110, thereby enabling fine tuning of the heat generated by induction heating assembly 100 and the corresponding drum temperature. By contrast, conventional resistance heaters have only one or two heating levels.

The induction heating assembly 100 may be positioned in any location upstream of the chamber 28. For example, the induction heating assembly 100, e.g., at least the heat exchanger 114 thereof, may be positioned within inlet duct 34 according to one or more exemplary embodiments. In addition, induction coil 110 may be positioned at any suitable location where the electromagnetic field generated by induction coil 110 may interact with heating plate 112 to generate heat. As another example, the induction heating assembly 100 may also or instead be positioned at least partly in the intermediate duct 52, among other possible exemplary locations.

Figure 3:
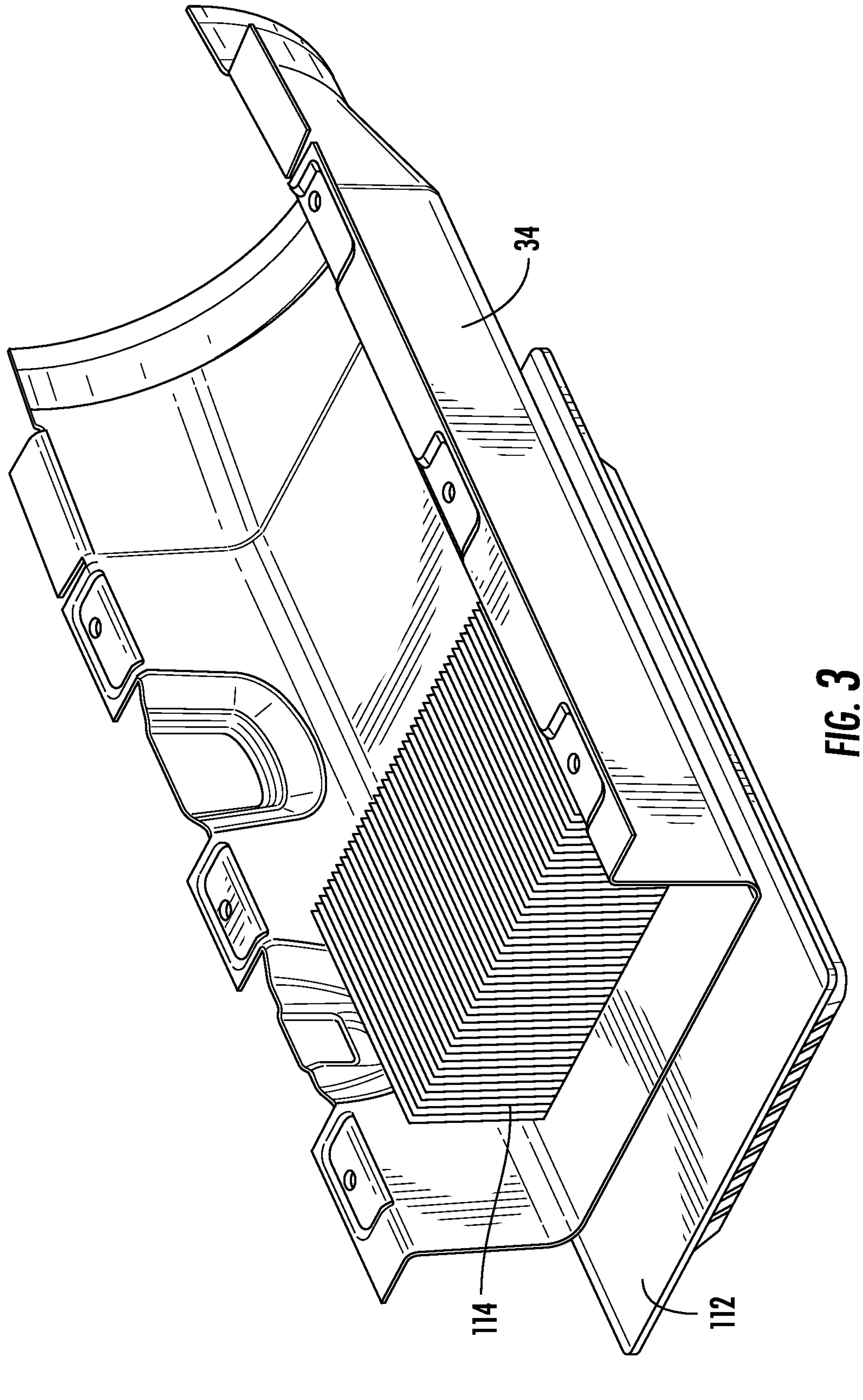
FIG. 3 provides a perspective view of a portion of an exemplary inlet duct for a dryer appliance such as the dryer appliance of FIG. 1 according to one or more exemplary embodiments of the present subject matter.
Figure 4:
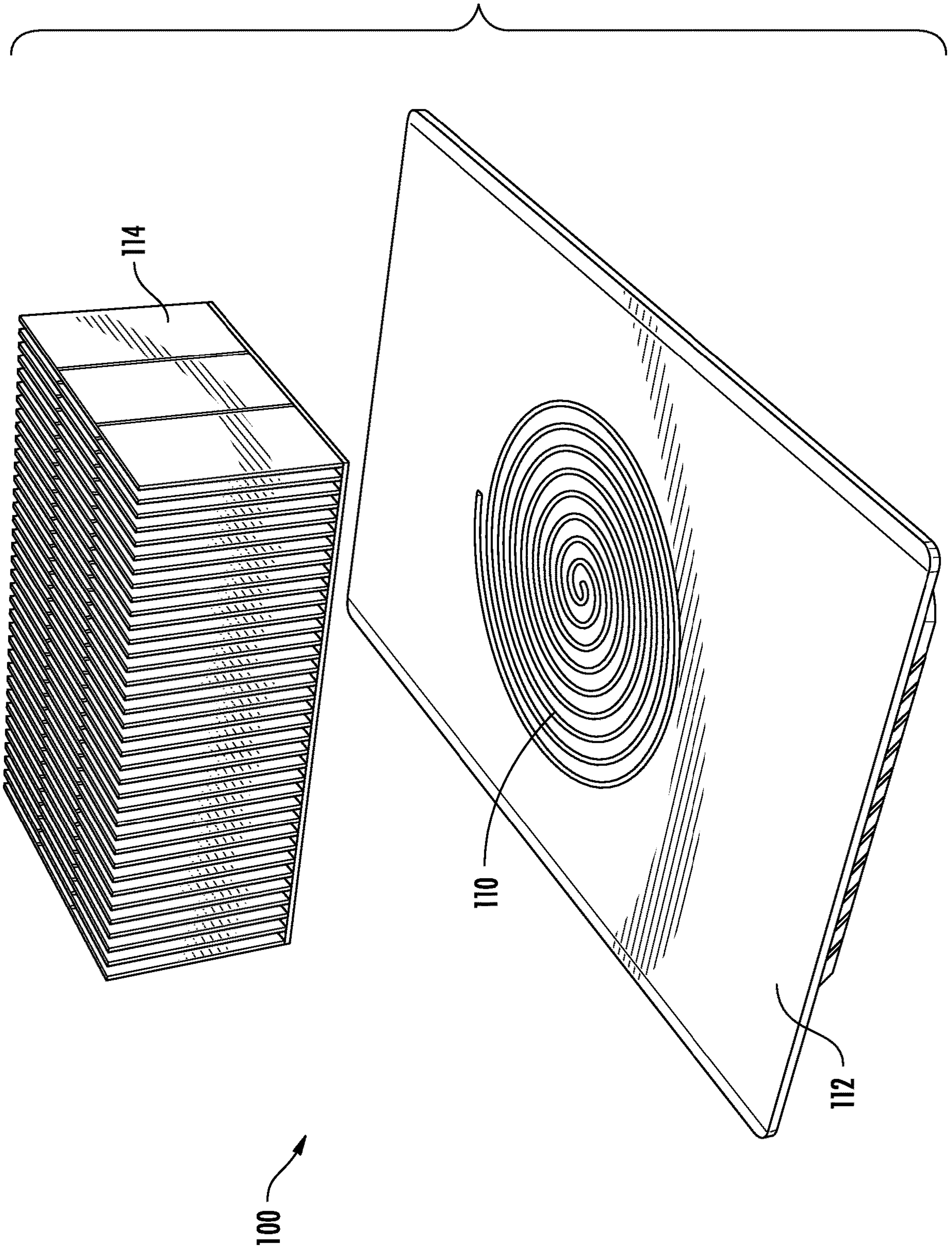
FIG. 4 provides an exploded view of an exemplary induction heating assembly according to one or more exemplary embodiments of the present subject matter.
Figure 5:
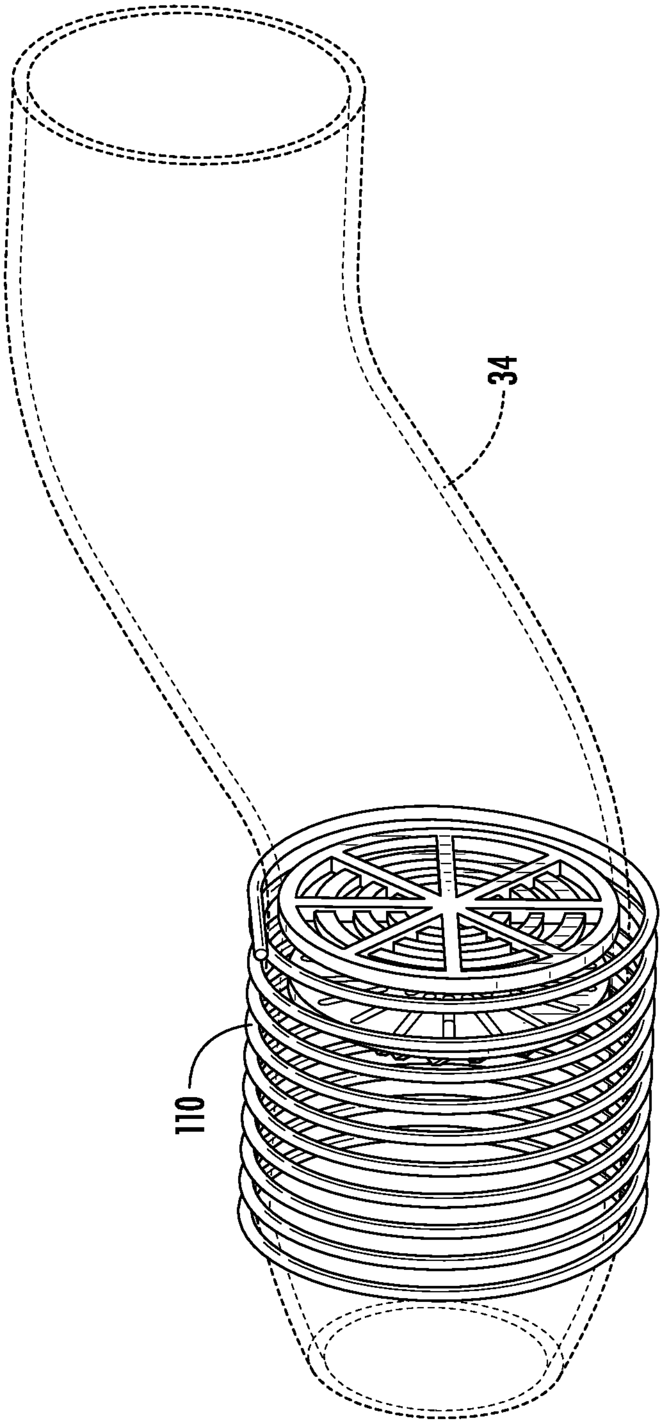
FIG. 5 illustrates an exemplary induction heating assembly mounted in and to an inlet duct of a dryer appliance according to one or more additional exemplary embodiments of the present subject matter.
Figure 6:
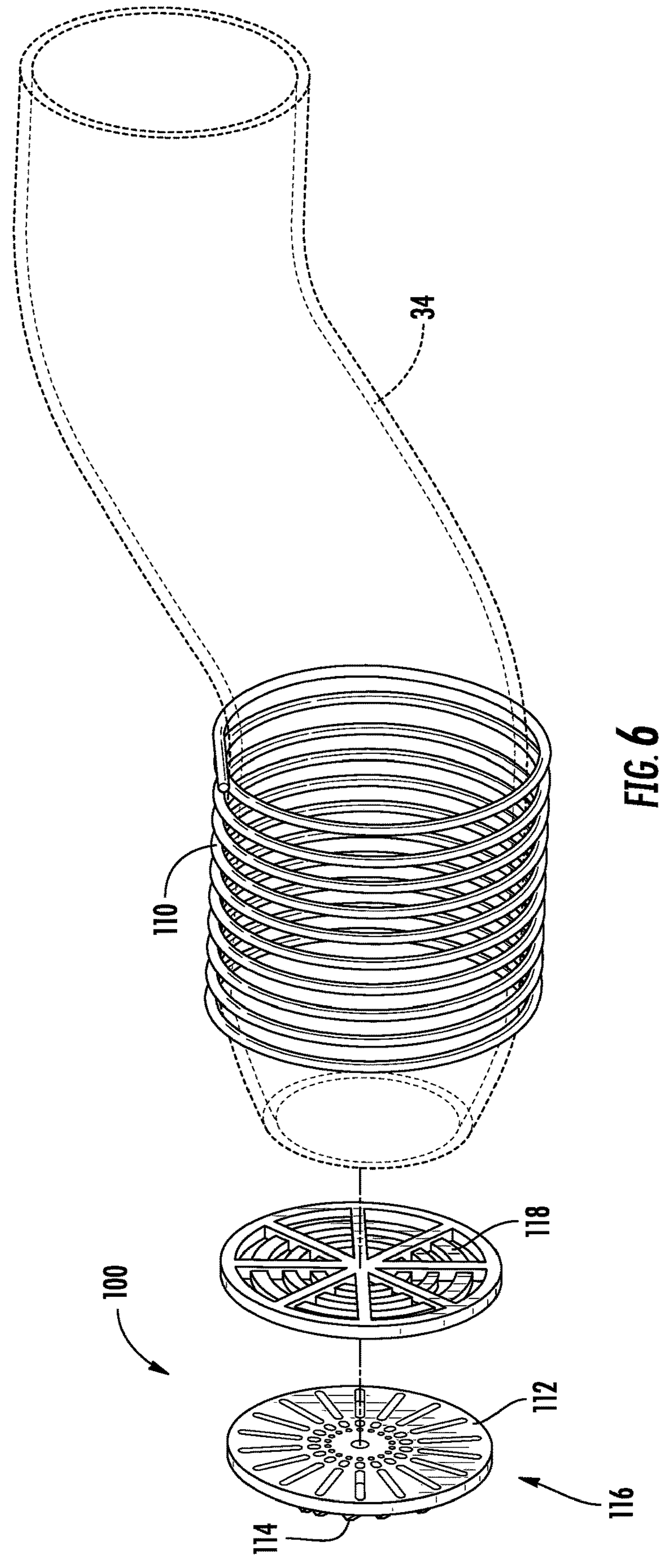
FIG. 6 provides an exploded view of the induction heating assembly of FIG. 5.

In some embodiments, such as the exemplary embodiment illustrated in FIGS. 3 and 4, one or more components of the induction heating assembly 100 may be positioned within the inlet duct 34. For example, in some embodiments such as the example embodiment illustrated in FIGS. 3 and 4, the heating plate 112 may be positioned outside the inlet duct 34 and the heat exchanger 114 may be positioned within the inlet duct 34, such as the heating plate 112 may be positioned at and in contact with an exterior surface of an outer wall of the inlet duct 34, and the heat exchanger 112 may be positioned at and in contact with an interior surface of the same outer wall of the inlet duct 34. Thus, the heat exchanger 114 may be in conductive thermal communication with the heating plate 112 through the outer wall of the inlet duct 34.

Referring now to FIGS. 5 through 9, in some embodiments the induction heating assembly 100 may include a rotary component, e.g., an impeller 116, and a stator 118. For example, the heat exchanger 114 may define the impeller 116 and may be rotatably mounted within the inlet duct 34. In such embodiments, the induction heating assembly 100 may further include a stator 118 fixedly mounted within the inlet duct 34. The impeller 116 may include a plurality of fins or rotor blades, e.g., impeller blades, comprising a non-ferritic metal material, such as an aluminum material, etc., as described above. For example, the heat exchanger 114 may include a plurality of impeller blades comprised of a non-ferritic material. Such embodiments may further include a flow conditioner plate, e.g., downstream of the rotor blades of the heat exchanger 114. The flow conditioner plate (see, e.g., FIGS. 6 and 8) may include a plurality of apertures, such as elongated radial apertures, which are configured to provide a laminar flow of air from the impeller 116, e.g., to increase the laminarity of the air flow downstream of the flow conditioner plate as compared to the air flow upstream of the flow conditioner plate. In some embodiments, the flow conditioner plate may be the heating plate 112 or a portion of the heating plate 112. Thus, for example, the flow conditioner plate may comprise a ferritic material, whereby the flow conditioner plate of the impeller 116 may be heated in the presence of the electromagnetic field generated by the induction coil 110 when the coil 110 is energized. Additionally, the stator 118 may comprise a ferritic material, whereby the stator 118 may also comprise a heating plate, such as a portion of the heating plate 112, or the stator 118 may be the only heating plate in the induction heating assembly 100 in some embodiments.

Figure 7:
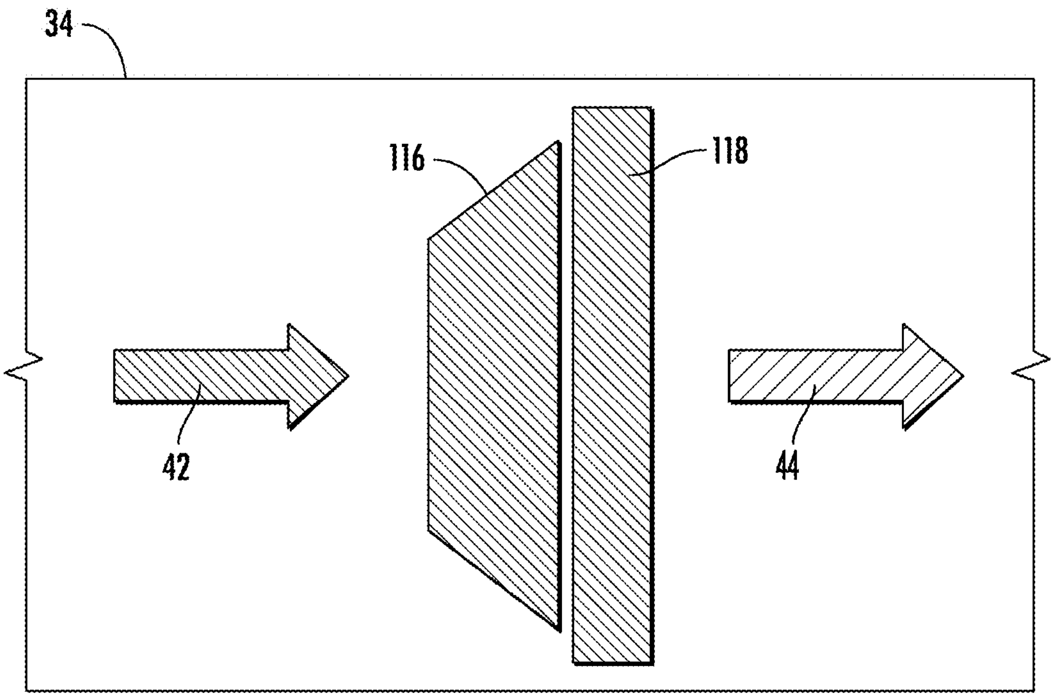
FIG. 7 provides a schematic illustration of air flow through the inlet duct and the induction heating assembly of FIG. 5.
Figure 8:
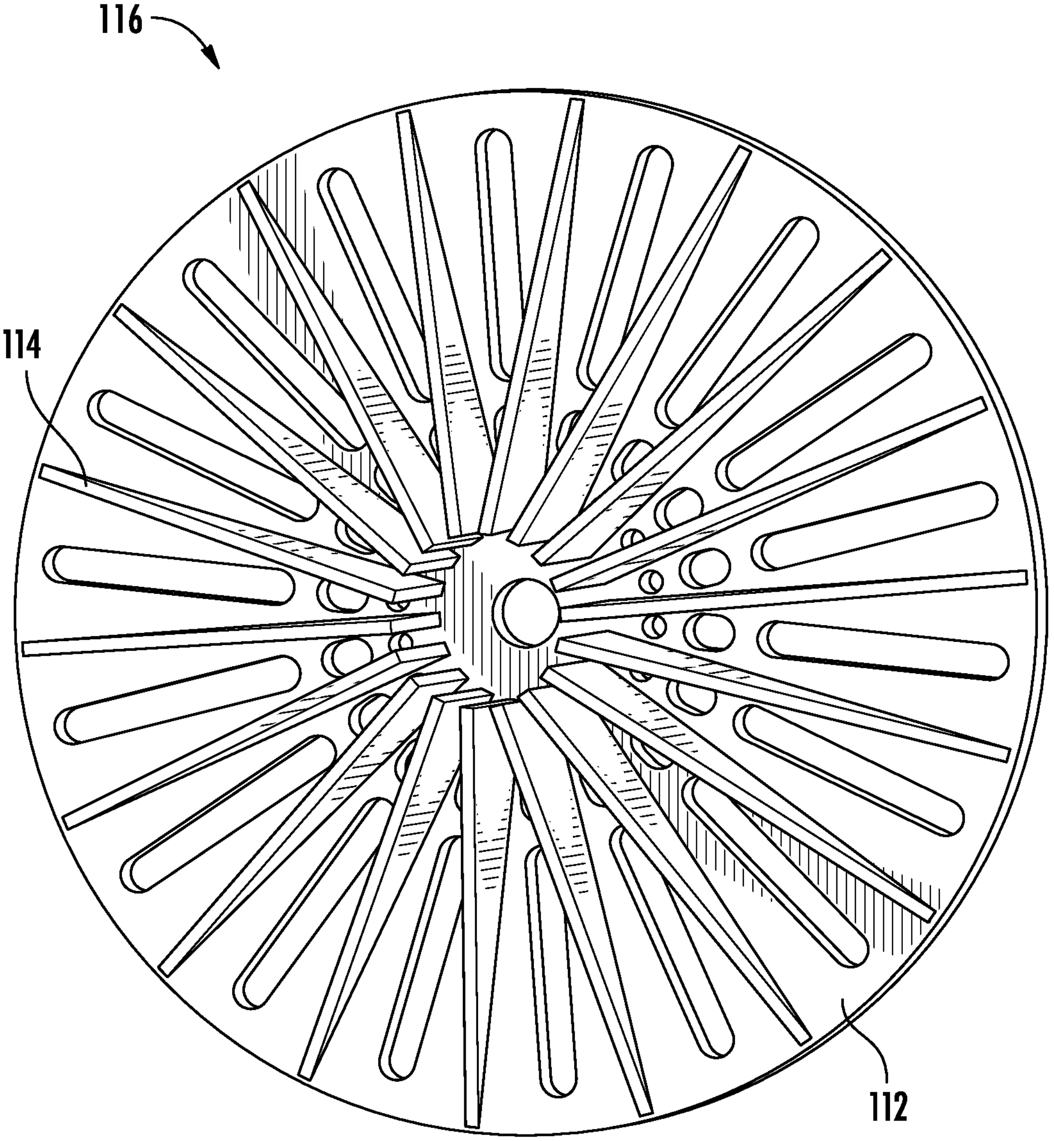
FIG. 8 provides a perspective view of an exemplary impeller of the induction heating assembly of FIG. 5.
Figure 9:
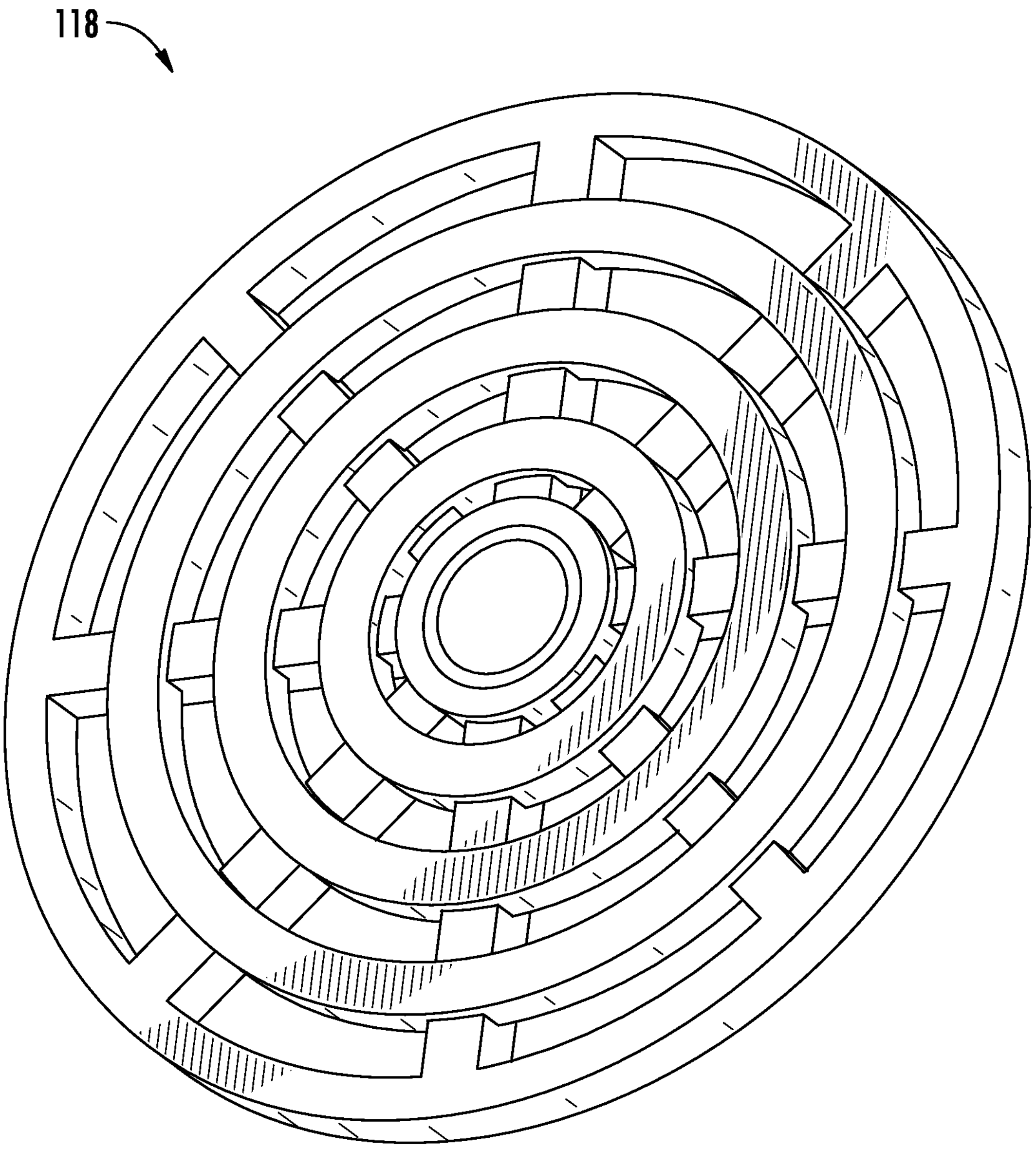
FIG. 9 provides a perspective view of an exemplary stator of the induction heating assembly of FIG. 5.

As may be seen in FIG. 7, the impeller 116 may be positioned upstream of the stator 118, with the heat exchanger 114 (see, e.g., FIGS. 6 and 8) positioned on an upstream side of the impeller 116. Thus, the incoming flow of ambient air 42 may initially encounter the impeller 116, e.g., the rotor blades or fins thereof and the rotor blades or fins of the impeller 116 may be the heat exchanger 114 or a portion of the heat exchanger 114. The flow of air may then pass through the flow conditioner plate, which may be heating plate 112 or a portion thereof, and then through the stator 118. As illustrated in FIG. 7, the air may thus be heated by the induction heating assembly 100 as the air flows through each portion of the induction heating assembly, thereby providing the flow of heated air 44 downstream of the induction heating assembly 100. Moreover, it should be understood that while FIG. 7 illustrates the ambient air 42 and heated air 44 relative to the induction heating assembly 100 in the context of a particular exemplary embodiment wherein the induction heating assembly 100 includes the impeller 116 and stator 118, the general flow scheme depicted in FIG. 7 is also applicable to other embodiments as well, e.g., the exemplary heat exchanger 114 illustrated in FIGS. 3 and 4 may also be positioned downstream of the ambient air 42 and upstream of the heated air 44, among other possible examples.

In various embodiments, the induction coil 110 may include a winding, such as a spiral winding (see, e.g., FIG. 4) or a helical winding. For example, in some embodiments, the induction coil 110 may comprise a helical winding around the inlet duct 34. In some embodiments, the induction coil 110 may be wound around an outside of the inlet duct 34, such as encircling an entire outer perimeter of the inlet duct 34 at least once and in contact with an exterior surface of the inlet duct 34. In such embodiments, the induction coil 110 may be helically wound about and/or around the inlet duct 34, e.g., around the outside of the inlet duct 34.

It should be appreciated that the configurations of dryer appliance 10 and induction heating assemblies 100 described above are only used for explaining aspects of the present subject matter. The position and configuration of induction heating assembly 100 may vary according to alternative embodiments. Such variations are contemplated as within the scope of the present subject matter.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A dryer appliance defining a vertical direction, a lateral direction, and a transverse direction, the dryer appliance comprising:

a cabinet;

a drum rotatably mounted within the cabinet, the drum defining a chamber for receipt of clothes for drying and a chamber inlet;

an inlet duct fluidly coupled to the chamber inlet;

an air handler in fluid communication with the inlet duct for urging a flow of air through the inlet duct and into the chamber; and an induction heating assembly in thermal communication with the inlet duct, the induction heating assembly comprising:

an induction coil for generating an electromagnetic field;

a heating plate for generating heat when energized by the electromagnetic field; and a heat exchanger comprising an impeller rotatably mounted within the inlet duct and in conductive thermal communication with the heating plate via direct contact between the heat exchanger and the heating plate.

2. The dryer appliance of claim 1, wherein the heating plate comprises a first material and the heat exchanger comprises a second material different from the first material.

3. The dryer appliance of claim 2, wherein the first material is a ferritic material.

4. The dryer appliance of claim 2, wherein the second material comprises aluminum.

5. The dryer appliance of claim 1, wherein the induction heating assembly further comprises a stator fixedly mounted within the inlet duct.

6. The dryer appliance of claim 5, wherein the heat exchanger comprises a flow conditioner plate comprising a ferritic material, the flow conditioner plate comprising a plurality of elongated radial apertures configured to provide a laminar flow of air from the impeller.

7. The dryer appliance of claim 1, wherein the induction coil is wound around an outside of the inlet duct.

8. An induction heating assembly for heating a flow of air in a dryer appliance, the dryer appliance comprising an inlet duct in fluid communication with a chamber; the induction heating assembly comprising:

an induction coil for generating an electromagnetic field;

a heating plate for generating heat when energized by the electromagnetic field; and a heat exchanger comprising an impeller configured for rotatably mounted within the inlet duct and in conductive thermal communication with the heating plate via direct contact between the heat exchanger and the heating plate.

9. The induction heating assembly of claim 8, wherein the heating plate comprises a first material and the heat exchanger comprises a second material different from the first material.

10. The induction heating assembly of claim 9, wherein the first material is a ferritic material.

11. The induction heating assembly of claim 9, wherein the second material comprises aluminum.

12. The induction heating assembly of claim 8, further comprising a stator configured for fixedly mounting within the inlet duct of the dryer appliance.

13. The induction heating assembly of claim 12, wherein the heating plate comprises a flow conditioner plate comprising a ferritic material, the flow conditioner plate comprising a plurality of elongated radial apertures configured to provide a laminar flow of air from the impeller.

14. The induction heating assembly of claim 8, wherein the induction coil is configured to be wound around an outside of the inlet duct of the dryer appliance.

* * * * *